United States Patent [19]
Rabe

[11] Patent Number: 5,358,674
[45] Date of Patent: Oct. 25, 1994

[54] PROCESS FOR PREPARING CERAMIC FIBERS FROM POLYSILOXANES

[75] Inventor: James A. Rabe, Midland, Mich.

[73] Assignee: Dow Corning Corporation, Midland, Mich.

[21] Appl. No.: 33,723

[22] Filed: Mar. 18, 1993

[51] Int. Cl.⁵ .................................................. D01F 9/10
[52] U.S. Cl. ........................................ 264/22; 264/25; 264/65; 264/211.17; 264/DIG. 19
[58] Field of Search ................ 264/22, 25, 65, 211.17, 264/DIG. 19

[56] References Cited

U.S. PATENT DOCUMENTS

| | | | |
|---|---|---|---|
| 4,260,780 | 4/1981 | West | 556/430 |
| 4,276,424 | 6/1981 | Peterson | 556/430 |
| 4,314,956 | 2/1982 | Baney | 264/65 |
| 4,324,901 | 4/1982 | West | 556/430 |
| 4,869,854 | 9/1989 | Takeda et al. | 264/22 |
| 5,063,102 | 11/1991 | Lee et al. | 428/209 |
| 5,071,600 | 12/1991 | Deleeuw | 264/22 |
| 5,082,872 | 1/1992 | Burns | 522/77 |
| 5,124,212 | 6/1992 | Lee et al. | 429/429 |
| 5,167,881 | 12/1992 | Atwell | 264/22 |

FOREIGN PATENT DOCUMENTS 435065 7/1991 European Pat. Off. .

Primary Examiner—James Derrington
Attorney, Agent, or Firm—Roger E. Gobrogge

[57] ABSTRACT

Ceramic SiCO fibers are formed by spinning a mixture of a substantially linear polysiloxane fluid having unsaturated hydrocarbon substituents and a photoinitiator into a fiber, exposing the fiber to radiation, and heating the fiber in an inert environment to a temperature above about 800° C.

12 Claims, 1 Drawing Sheet

PROCESS FOR PREPARING CERAMIC FIBERS FROM POLYSILOXANES

BACKGROUND OF THE INVENTION

The present invention relates to a novel method of preparing SiCO ceramic fibers in which a composition comprising a substantially linear polysiloxane fluid is used as the ceramic fiber precursor.

Small diameter, polymer-derived SiCO ceramic fibers are useful as the reinforcing phase in composite structures. Numerous methods for the preparation of these fibers are known in the art and several are used commercially. The most common approach has been to start with a polycarbosilane polymeric precursor. This precursor, however, presents several difficulties. For instance, the cage-like molecular structure of polycarbosilane makes it difficult to spin. Similarly, the polymer's slow crosslinking and the green fiber's fragility inhibit the use of continuous processing.

The use of polysiloxane resins as precursors to SiCO fibers is also known in the art. For instance, published European Patent Application 435,065 teaches spinning such resins into green fibers, doping the green fibers with boron and pyrolyzing the green fibers to form polycrystalline SiC fibers. These resins, however, are also difficult to spin and the green fibers can be fragile.

The present inventor has now discovered that a composition comprising substantially linear polysiloxanes, as compared to the resins described above, can be easily drawn into fibers. These fibers can be rapidly cured into green fibers which are considerably tougher than those made from resinous precursors and, upon pyrolysis, produce SiCO fibers.

SUMMARY OF THE INVENTION

The present invention relates to a method for preparing a ceramic fiber. The method comprises first spinning a composition comprising a substantially linear polysiloxane fluid having units of the structure $[R_2SiO]$ and a photoinitiator into a fiber. R in this formula independently comprises a hydrogen or a hydrocarbon radical, but at least about 20% of the siloxane units should contain at least 1 unsaturated hydrocarbon radical. The spun fibers are exposed to radiation for a time sufficient to render them non-flowable. The non-flowable fibers are then heated in an inert environment to a temperature above about 800° C. to convert them into ceramic SiCO fibers.

DETAILED DESCRIPTION OF THE INVENTION

Figure 1:
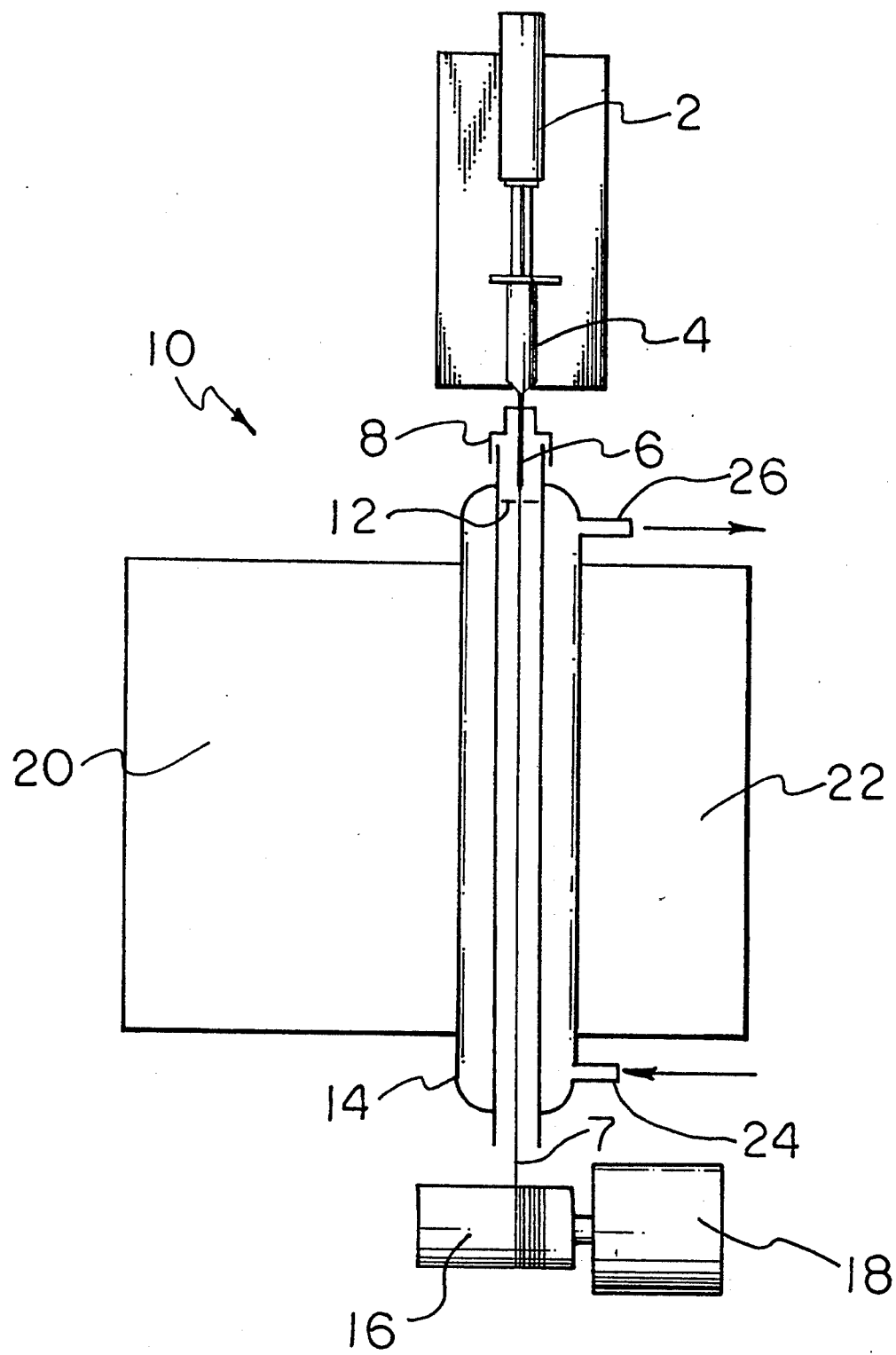

The present invention is based on the discovery that a composition comprising substantially linear polysiloxanes can be used as precursors to SiCO ceramic fibers. This discovery was particularly unexpected since previous known attempts to pyrolyze linear siloxanes had resulted in poor ceramic yields due to the evolution of volatile cyclic polysiloxanes. Consequently, it was not known whether linear polysiloxanes would have sufficient char yield for fiber formation. It has now been discovered that the incorporation of sufficient unsaturated groups on the polysiloxane along with the use of a photoinitiator allows fibers derived from such materials to be rapidly cured upon exposure to radiation and to provide ceramic fibers in high yield upon pyrolysis.

Essentially, the process of the present invention comprises forming a mixture comprising a polysiloxane and a photoinitiator, spinning the mixture into a fiber, curing the fiber by exposure to radiation and heating the cured fiber to form the ceramic fiber.

The polysiloxanes which can be used in the process of this invention and their methods of manufacture are well known in the art and many are commercially available. Essentially, these polysiloxanes comprise substantially linear polysiloxane fluids or mixtures of substantially linear polysiloxane fluids having units of the structure $[R_2SiO]_x$, wherein x is a positive integer, R independently comprises a hydrogen or a hydrocarbon radical, preferably having 1–20 carbon atoms, and at least about 20% of the siloxane units contain at least 1 unsaturated hydrocarbon radical. As used herein "substantially linear" is used to describe polysiloxanes which are primarily linear, containing only incidental amounts of branching (e.g., less than 1% and preferably less than 0.1% of the siloxane units). Examples of R groups in the siloxane units include methyl, ethyl, propyl, butyl, cyclohexyl, phenyl, phenylmethyl and the like. Examples of the unsaturated R groups include vinyl, allyl, hexenyl, acetylenic and the like. These polymers are generally endcapped with units of the structure $R_3SiO_{\frac{1}{2}}$, wherein R is as defined above. As is known in the art, the amount of endcapper incorporated in the polymer can be used to control the polymer's molecular weight. In addition, copolymers containing more than one of the above units may be used.

Generally, the above polysiloxane should be liquid at room temperature and should be of a viscosity which allows it to be drawn into a small diameter fiber. In a preferred embodiment of the invention, the polysiloxane should have a viscosity between about 10 and 200 Pa-S at 25° C.

In order to obtain a desirable char yield, at least about 20% of the above siloxane units should contain at least 1 unsaturated hydrocarbon. Preferably, at least about 50% of the siloxane units should contain at least 1 unsaturated hydrocarbon. In the most preferred embodiment, polysiloxanes containing units nearly entirely of the structure [MeViSiO] (Me=methyl, Vi=vinyl) are used. The remaining saturated R groups in the polysiloxane can be used to control the composition of the ceramic char (e.g., excess carbon content).

Examples of such polymers include $Me_2ViSiO[MeViSiO]_xSiMe_2Vi$, $Me_3SiO[MeViSiO]_xSiMe_3$, $Me_2PhSiO[MeViSiO]_xSiMe_2Ph$, $Me_3SiO[Me(CH_2CHCH_2)SiO]_xSiMe_3$, $Me_3SiO[MeViSiO]_x[Me_2SiO]_ySiMe_3$, $Me_3SiO[MeViSiO]_x[MePhSiO]_ySiMe_3$, and the like (Me=methyl, Vi=vinyl, Ph=phenyl) and x and y are sufficient to provide a viscosity which allows the polymer to be drawn into a small diameter fiber (e.g., integers of 1–1000), provided that at least 20% of the units contain at least 1 unsaturated hydrocarbon as described above). Such polysiloxanes and methods for their manufacture are set forth in, for example, "Chemistry and Technology of Silicones" (Academic Press—New York) by Walter Noll which is incorporated herein by reference.

It should be noted that several of the above polysiloxanes may be mixed without adversely affecting the present invention, so long as they do not separate to an extent which prevents fiber formation. Moreover, limited amounts (e.g., up to about 10–25%) of cyclic polysiloxanes or polysiloxanes without the unsaturated sidegroups may be blended into the composition of the invention.

The photoinitiators to be used in the process of the present invention are known in the art for use in curing polysiloxanes in, for example, silicone rubbers or sealants. Generally, these materials absorb radiation and are converted to compounds which assist in initiating reaction of the unsaturated R groups to crosslink the polysiloxane. Nearly any material which produces this desired result without causing premature gelation or other incompatibility with the polysiloxanes may be used. Such photoinitiators are described, for example, in U.S. Pat. Nos. 5,063,102 and 5,124,212, both of which are incorporated herein by reference. Examples of such materials include, but are not limited to, ketones such as benzophenone, acetonaphthone, acetophenone, benzoin methyl ether, benzoin isobutyl ether, 2-hydroxy-2-methyl-1-phenylpropan-1-one, 1-hydroxycyclohexyl-phenyl ketone, 2,2-diethoxyacetophenone, 3-hydroxypropylphenyl ketone and 3-hydroxypropyl-p-isopropyl-phenyl ketone.

Other classes of useful photoinitiators include compatible polysilanes of the type described by West in U.S. Pat. No. 4,260,780, the aminated methylpolysilanes described by Baney et al. in U.S. Pat. No. 4,314,956, the methylpolysilanes described by Peterson et al. in U.S. Pat. No. 4,276,424 and the polysilastyrene described by West et al. in U.S. Pat. No. 4,324,901, all of which are hereby incorporated by reference.

Generally, enough of the photoinitiator must be used to insure that the cure is fast enough to fix the extruded material in the desired fiber form. Photoinitiator concentrations in the range of about 0.1 to about 10 wt % are generally satisfactory but higher levels, although still functional, are less economical and could reduce char yield.

The source of radiation used to initiate the above compounds is generally dependent on the initiator selected. In most instances it is preferred to use UV radiation. This radiation can be generated, for example, by medium pressure mercury vapor lamps. Hence, radiation sources with a wavelength in the range of about 200–400 nm with a power in the range of about 50–500 watts are used. Other sources, however, such as x-ray or electron beams may also be used herein.

In addition to the photoinitiator, other compounds may be added to modify the curing characteristics of the polysiloxane mixture. These can included, for example, compounds containing 2 or more mercaptofunctional groups such as polyorganosiloxanes containing an average of at least 2 silicon bonded mercaptoalkyl radicals per molecule, mercaptans, mercaptocarboxylic acids, or an ester derived from a mercatocarboxylic acid and a mono or polyhydric alcohol. Such materials are described, for example, in U.S. Pat. Nos. 5,063,102 and 5,124,212, both of which are incorporated herein by reference. These materials can include, for example, dimercaptodiethylether, glycol dimercaptoacetate. trimethylolpropanetrimercaptoproprionate (TMPTMP) or $R_3SiO[Me_2SiO]_xM[(HSCH_2CH_2CH_2)MeSiO]_ySiR_3$. These materials can accelerate the cure rate and help eliminate tacky surfaces in cases where the presence of oxygen causes surface cure inhibition. Typically, such compounds are present in amounts up to about 5 wt %.

The process of the present invention first comprises mixing the above components. Generally this mixing can be performed by merely mixing the ingredients or by mixing the ingredients in a solvent. Any solvent which dissolves the polysiloxane and the initiator may be used. For instance, solvents such as toluene, benzene, xylene, heptane, ethers, alcohols, and the like may be used.

The above mixture is then spun into a fiber by conventional spinning techniques. Since the polysiloxanes are liquid at room temperature, however, it is most convenient to merely extrude them through an orifice such as a spinnerette and then draw them to diameters of less than about 100 micrometers. More preferably, the fibers are drawn to diameters of about 10–50 micrometers. Fibers of this size are generally more flexible than larger fibers and, thus, can be more readily woven into the reinforcing phase of a composite (e.g., cloth).

The fibers formed above are then cured (infusibilized) to render them non-flowable and to prevent them from deforming when pyrolyzed. Such curing is accomplished by exposing the green fiber to radiation as described above. In a preferred embodiment of the invention, the fiber is exposed to the radiation in an environment from which air is excluded to avoid oxygen inhibition which can leave surfaces under-cured and sticky.

After curing, the fibers are pyrolyzed by heating to temperatures greater than about 800° C., and preferably at temperatures above about 1000° C. in a non-oxidizing environment (e.g., argon, vacuum, etc.). The fibers are heated at the desired temperature for a time sufficient to form the SiCO fibers. Alternatively, the pyrolysis temperature can be ramped up (e.g., at 1°–5° C./min), held at the desired maximum temperature and ramped down. This heating can either be performed on a continuous basis or the cured fiber can be collected and batch pyrolyzed.

In an alternative embodiment of the invention, the fibers may be doped with a boron source and heated sufficiently to remove oxygen as described in U.S. Pat. No. 5,167,881, which is incorporated herein by reference, to produce polycrystalline SiC fibers.

The resultant SiCO fibers are useful as the reinforcing phase in various composite applications.

The following non-limiting examples are provided so that one skilled in the art will more fully understand the invention.

EXAMPLE 1

This example was performed to demonstrate that polysiloxane fluids can be cured in short times to materials which give useful char yields when pyrolyzed.

A low molecular weight polysiloxane fluid of the structure $HO(MeViSiO)_xH$ with a viscosity of about 3 Pa-S at 25° C. was combined with Darocure 1173 (2-hydroxy-2-methyl-1-phenylpropan-1-one) and TMPTMP, cast as 15 mil thick films on a Q panel and exposed to UV radiation in a Co-light UV-6 source. The following table summarizes the results:

| Ex No | Amt Fluid | Amount Darocure | Amount TMPTMP | Lamp Watts | Exposure Time-Sec | Results |
| --- | --- | --- | --- | --- | --- | --- |
| 1 | 100 | 5 | 0 | 200 | 10 | Dry Cure Throughout |
| 2 | 100 | 1 | 0 | 200 | 10 | Tacky Surface |
| 3 | 100 | 5 | 0 | 125 | 8.5 | Barely Cured |

-continued

| Ex No | Amt Fluid | Amount Darocure | Amount TMPTMP | Lamp Watts | Exposure Time-Sec | Results |
|---|---|---|---|---|---|---|
| 4 | 100 | 5 | 5 | 125 | 8.5 | Dry Cure Throughout |

The cured films from Examples 1–4 were pyrolyzed by heating 15° C./min to 1200° C. under nitrogen in a tube furnace to yield SiCO ceramics. Char yields were as follows:

| Ex No | Char Yield |
|---|---|
| 1 | 70.7% |
| 2 | 74.7% |
| 4 | 65.8% |

EXAMPLE 2

This example was performed to determine whether polysiloxane fluids can be cured within times acceptable during on-line processing.

Portions of 163,400 centipoise ViMe$_2$SiO(MeViSiO)$_x$SiMe$_2$Vi fluid were mixed with Darocure 1173 and Dimethyl, Methyl (mercaptopropyl) Siloxane (DMMS), cast as 15 mil thick films on a Q panel and exposed to UV radiation in a Ashdee Model UV-12H/2 source. The following table summarizes the results:

| Ex No | Percent Darocure | Percent DMMS | Lamp Setting | Exposure Time-Sec | Results |
|---|---|---|---|---|---|
| 5 | 5 | 0 | High | 0.5 | Surface Slightly Tacky Barely Cured Below |
| 6 | 5 | 1 | High | 0.5 | Dry Cure Throughout |
| 7 | 5 | 1 | High | 0.3 | Dry Cure, Slight Self-Adhesion |
| 8 | 1 | 1 | High | 0.5 | Tacky Surface, Dry Below |
| 9 | 1 | 1 | High | 1.0 | Slight Surface Tack, Dry Cure Below |
| 10 | 1 | 3 | Low | 0.5 | Rather Tacky Surface, Dry Cure Below |
| 11 | 1 | 5 | Low | 0.5 | Tacky Surface, Dry Below |
| 12 | 1 | 5 | Low | 1.0 | Slight Surface Tack, Dry Below |
| 13 | 5 | 5 | Low | 0.3 | Dry Cure Throughout |
| 14 | 5 | 5 | Low | 1.0 | Dry Cure Throughout |

EXAMPLE 15

This Example demonstrates spinning and on-line UV-curing of linear (MeViSiO)$_x$ siloxanes.

A mixture of 75 parts 163,400 centipoise ViMe$_2$SiO(MeViSiO)$_x$SiMe$_2$Vi fluid, 25 parts 6600 centipoise ViMe$_2$SiO(MeViSiO)$_x$SiMe$_2$Vi fluid, and 5 parts Darocure 1173 were extruded at 3 rates, 0.26 cc/min, 0.21 cc/min, and 0.16 cc/min, on the apparatus shown in FIG. 1 and taken up at a constant 140 fpm. In this FIGURE, 10 is the siloxane fluid spin/cure apparatus; 2 is a variable speed syringe pump; 4 is a 2 mL syringe; 6 is a 20 gauge needle with a squared-off end; 8 is a rubber septum; 12 is an annular shield; 20 is a Portacure 1500F UV source (form American Ultraviolet Co.) with 1600 watts and a 19 cm cure zone; 22 is a reflector; 14 is a jacketed quartz column; 24 is a water inlet; 7 is the fiber; 16 is a take-up reel; and 18 is a variable speed motor. The Portacura lamp was set on high throughout the run. Fibers of about 20–100 micrometer diameter was collected at each of the feed rates. The fiber was cured sufficiently to maintain its shape and allow separation of individual filaments. However, filaments tended to stick together because of rubbery surface adhesion. When the fiber was cut from the spool, it tended to tangle because of the above adhesion and the considerable and variable tension.

A portion of the above fiber was cut from the spool, straightened as well as possible, then pyrolyzed 3° C./min to 1200° C. under nitrogen in a tube furnace. The product had a 80.7% yield of shiny black fiber with an average diameter of 42.9±10 micrometers and a composition of 40 wt. % silicon, 37.5 wt. % carbon and 22.4 wt % oxygen. Fusion at crossover points prevented separation of long individual filaments.

That which is claimed is:

1. A method for preparing a ceramic fiber comprising:
   spinning a composition comprising a substantially linear polysiloxane fluid having units of the structure [R$_2$SiO] and a photoinitiator into a fiber, wherein R independently comprises a hydrogen or a hydrocarbon radical and at least about 20% of the polysiloxane units contain at least 1 unsaturated hydrocarbon radical;
   exposing the fiber to radiation for a time sufficient to render it non-flowable; and
   heating the non-flowable fiber in an inert environment to a temperature above about 800° C. to convert it to a ceramic fiber.

2. The method of claim 1 wherein the polysiloxane fluid has a viscosity in the range of about 10 to about 200 Pa-S at 25° C.

3. The method of claim 1 wherein at least about 50% of the polysiloxane units contain at least 1 unsaturated hydrocarbon radical.

4. The method of claim 1 wherein the polysiloxane is terminated by groups comprising R$_3$SiO$_{\frac{1}{2}}$, wherein each R independently comprises hydrogen or a hydrocarbon radical.

5. The method of claim 1 wherein greater than about 75% of the polysiloxane units comprise CH$_3$(CH$_2$CH)SiO.

6. The method of claim 1 wherein the photoinitiator is selected from the group consisting of ketones, ethers and polysilanes.

7. The method of claim 1 wherein the photoinitiator is selected from the group consisting of benzophenone, acetonaphthone, acetophenone, benzoin methyl ether, benzoin isobutyl ether, 2-hydroxy-2-methyl-1-phenyl-propan-1-one, 1-hydroxycyclohexylphenyl ketone, 2,2-diethoxyacetophenone, 3-hydroxypropylphenyl ketone, 3-hydroxypropyl-p-isopropylphenyl ketone and polysilanes.

8. The method of claim 1 wherein the photoinitiator is present at a level of about 0.1 to about 10 wt % based on the weight of the polysiloxane.

9. The method of claim 1 wherein the composition comprising the linear polysiloxane fluid and the photoinitiator also comprises a material having 2 or more mercapto functional groups.

10. The method of claim 9 wherein the compound having 2 or more mercapto functional groups is selected from the group consisting of trimethylolpropanetrimercaptoprorionate, dimercaptodiethylether and $R_3SiO[Me_2SiO]_x[(HSCH_2CH_2CH_2)MeSiO]_ySiR_3$.

11. The method of claim 1 wherein the radiation comprises ultraviolet radiation.

12. The method of claim 1 wherein the fiber is exposed to the radiation in an environment from which oxygen is excluded.

* * * * *